United States Patent
Mohamed et al.

(10) Patent No.: US 10,417,350 B1
(45) Date of Patent: Sep. 17, 2019

(54) ARTIFICIAL INTELLIGENCE SYSTEM FOR AUTOMATED ADAPTATION OF TEXT-BASED CLASSIFICATION MODELS FOR MULTIPLE LANGUAGES

(71) Applicant: Amazon Technologies, Inc., Seattle, WA (US)

(72) Inventors: Mohamed Thahir Peer Mohamed, Bellevue, WA (US); Mohammed Nazeeruddin, Bellevue, WA (US); Faizi Siddiqui, Medina, WA (US); Bin Zhu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 191 days.

(21) Appl. No.: 15/688,678

(22) Filed: Aug. 28, 2017

(51) Int. Cl.
 *G06F 17/20* (2006.01)
 *G06F 17/28* (2006.01)
 *G06Q 10/10* (2012.01)
 *G06N 20/00* (2019.01)

(52) U.S. Cl.
 CPC ........ *G06F 17/289* (2013.01); *G06F 17/2818* (2013.01); *G06N 20/00* (2019.01); *G06Q 10/10* (2013.01)

(58) Field of Classification Search
 CPC .................................................. H04L 63/20
 USPC ....................... 704/1–10, 230–277
 See application file for complete search history.

(56) References Cited

U.S. PATENT DOCUMENTS

| | | | |
|---|---|---|---|
| 6,885,985 B2 | 4/2005 | Hull | |
| 7,050,964 B2 | 5/2006 | Menzes et al. | |
| 7,533,013 B2 | 5/2009 | Marcu | |
| 2009/0182547 A1 | 7/2009 | Niu et al. | |
| 2014/0372351 A1* | 12/2014 | Sun | G06F 16/353 706/12 |
| 2015/0340024 A1* | 11/2015 | Schogol | G10L 15/26 704/235 |
| 2018/0032599 A1* | 2/2018 | Larsen | H04L 63/20 |

OTHER PUBLICATIONS

U.S. Appl. No. 15/045,030, filed Feb. 16, 2016, Bibaswan Kumar Chatterjee et al.
U.S. Appl. No. 14/935,426, filed Nov. 8, 2015, Gowda Dayananda Anjaneyapura Range et al.
U.S. Appl. No. 15/279,333, filed Sep. 28, 2016, Alex Klementiev et al.

(Continued)

*Primary Examiner* — Huyen X Vo
(74) *Attorney, Agent, or Firm* — Robert C. Kowert; Meyertons, Hood, Kivlin, Kowert & Goetzel, P.C.

(57) ABSTRACT

Influential token combinations corresponding to various classes associated with a machine learning model trained to classify text collections expressed in a first language are identified. A similarity metric between one or more influential token combinations and a classification candidate text collection (expressed in a second language) is determined. A substitute text collection corresponding to the classification candidate is generated based at least partly on the similarity metric. The substitute text collection is used as input to one or more machine learning models to identify a predicted class of the classification candidate.

21 Claims, 10 Drawing Sheets

(56) References Cited

OTHER PUBLICATIONS

"Implementing a CNN for Text Classification in TensorFlow", WILDML, Retrieved from URL: http://www.wildml.com/2015/12/implementing-a-cnn-for-text-classification-in-tensorflow/ on Jul. 14, 2017, pp. 1-20.
Amazon Web Services, "Amazon Machine Learning Developer Guide", Updated Aug. 2, 2016, pp. 1-146.
Tomas Mikolov, et al., "Efficient Estimation of Word Representations in Vector Space", arXiv:1301.3781v3 [cs.CL], Sep. 7, 2013, pp. 1-12.
Fraser Murray, "Text Classification using Artificial Neural Networks", May 13, 2015, pp. 1-70.
Wikipedia, "Word2vec", Retrieved from URL: https://en.wikipedia.org/wiki/Word2vec on Jul. 4, 2017, pp. 1-5.

* cited by examiner

ARTIFICIAL INTELLIGENCE SYSTEM FOR AUTOMATED ADAPTATION OF TEXT-BASED CLASSIFICATION MODELS FOR MULTIPLE LANGUAGES

BACKGROUND

As the costs of data storage have declined over the years, more and more data pertaining to a wide variety of applications can potentially be collected and analyzed using increasingly sophisticated machine learning algorithms. For example, a number of natural language processing (NLP) algorithms have been developed for analyzing and responding to text records, such as records of social media interactions, product support requests, medical status summaries and so on.

Supervised machine learning models for text analysis, including various types of models used for classification, require observation records of a training data set to be labeled—that is, the "true" class or label to which a given record belongs has to be determined for all the records of the training data before the model can be trained to make predictions regarding previously unseen or unlabeled data. In scenarios in which the input data consists of unstructured text, as for example in an environment in which observation records include email messages, social media messages and the like, labeling the records can often be a laborious, time consuming and expensive process. Often, subject matter experts may have to participate in the labeling. In order to obtain a desired level of prediction quality, many modern-day machine learning models may need very large labeled training data sets—in some cases comprising hundreds of thousands or even millions of records.

In many cases, the problems being solved using machine learning models which consume text as input may not be restricted to any particular natural language. Many organizations today have branches and offices in multiple countries with respective languages, or sell products in numerous countries, for example; even within a single country, in some cases multiple languages may be spoken in respective geographical regions. Input data for classification of natural language records associated with a particular domain, such as emailed problem reports directed to a customer support organization, may be received in several different languages. Generating sufficient labeled training data in all the different languages which may have to be processed for a particular machine learning application may represent a substantial technical and logistical hurdle.

Figure 1:
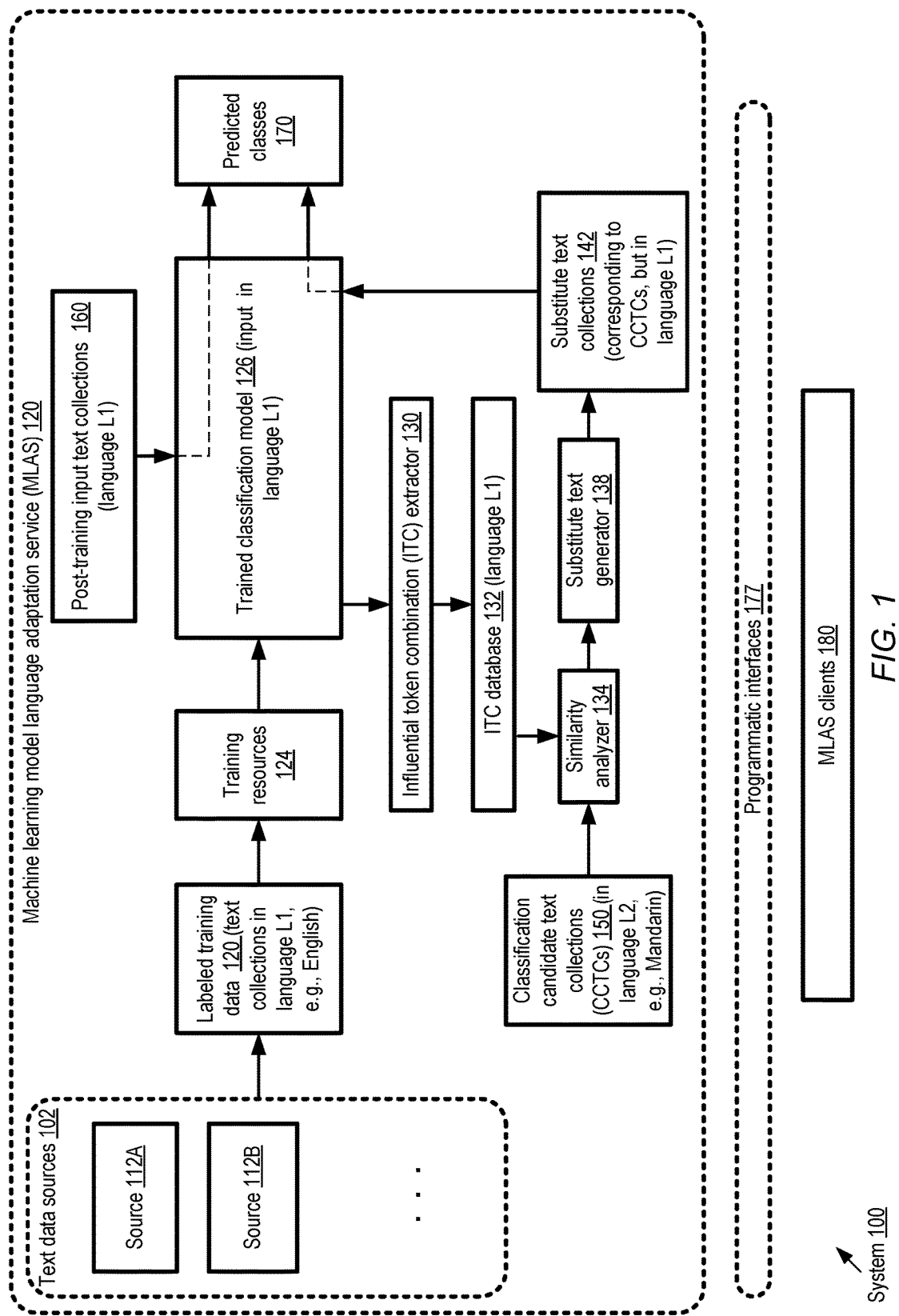
FIG. 1 illustrates an example system environment in which text-based machine learning classification models may be efficiently adapted to process input data expressed in multiple languages, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for adapting text-analyzing machine learning classification models trained using data in a particular language (such as English) to accept input in one or more other languages (such as German, Mandarin Chinese and the like) without retraining are described. In at least some embodiments, a first set of labeled text data records pertinent to a particular problem domain of interest may be obtained. The records may comprise tokens (e.g., words, symbols or the like, depending on the language) expressed in a particular natural language. A given text data record may be referred to as a "text collection" of that language—in English, for example, a text collection may comprise one or more phrases, sentences, paragraphs or the like, which may or may not fully comply with the grammatical and/or spelling-related rules of English. The labeled data may be used to train a classification model which is designed to classify input text collections as examples of one or more classes or categories associated with the problem domain.

After the model has been trained, in some embodiments a respective set of significant or influential token combinations (ITCs) may be identified with respect to at least some of the classes identified using the model. The token combinations may be deemed "influential" in that the presence or occurrence of the token combinations in an input text collection may be correlated with a high probability (e.g., a probability above some selected threshold) of the corresponding class being selected as the class to which the input text collection belongs. For example, consider a software bug report management system, to which customers of a software application submit complaints comprising at least some unstructured text fields which are to be categorized among several classes of bugs, such as "unexplained crash", "performance problem", "user interface problem" etc. using a classification model. If analysis of the trained classification model (trained in English for the bug report analysis problem domain) indicates that the presence of the sequence of words "slow response" in such an unstructured text field is correlated with a high probability that the complaint containing that text is an example of a "performance problem" complaint, the token combination "slow response" may be considered an influential token combination with respect to the "performance problem" class.

In various embodiments, the trained model may be intended to handle or process input text in the same language that was used for the training data. This first language, which is used for the training examples, may be referred to as the "training data language" (TDL) or the "source" language in some embodiments. In order to adapt the model to perform the same types of classifications for input initially expressed in a different language, without any additional training of the model and without the preparation of an entirely new language-specific model, the following approach may be used in at least some embodiments. When a classification candidate text collection or CCTC (a to-be-classified collection of tokens pertaining to the same problem domain or application as the trained model) expressed in a different language is received, respective similarity metrics may be determined between the candidate text collection and one or more of the influential token combinations identified using the trained model. The different language in which the CCTC is expressed may be referred to as the "adaptation target language" (ATL) or the target language in some embodiments. Any of a number of similarity analysis techniques may be used in different embodiments as described below in further detail—e.g., in one embodiment embedding vectors may be generated for each of the languages and used for distance-based similarity analysis, while in other embodiments machine translation algorithms may be used. In effect, a goal of the similarity analysis in at least some embodiments may comprise determining a measure of the extent to which terms similar to the influential token combinations are present in the classification candidate, under the assumption that if highly similar terms are present in the classification candidate, the class to which the classification candidate should be mapped may be determined based on the highly similar terms. In effect, from among the tokens which form the CCTC, those tokens whose similarity to one or more ITCs exceeds some threshold may be considered of high relevance to the classification of the CCTC, while other tokens may be considered less relevant (and may at least in some cases be ignored) in various embodiments.

In some embodiments, based at least in part on the similarity metrics or scores, a substitute text collection expressed in the TDL or source language may be generated corresponding to the candidate classification text collection. The substitute text collection may not necessarily represent a translation of the candidate text collection in such embodiments—as mentioned above, at least some parts (in some cases a large subset of the CCTC's tokens) may not be deemed sufficiently relevant for further consideration. Using the substitute text collection as input to one or more machine learning models, a predicted class of the CCTC may be identified in at least some embodiments. In some cases, as discussed below in further detail, the same trained model from which the ITCs were obtained may be used to classify the substitute text collections; in other embodiments, a different model may be used, or a combination of models may be used. Any of a number of different techniques may be used to construct the substitute text collection in different embodiments, depending for example on the characteristics or properties of the machine learning model(s)—e.g., in some cases, the relative sequencing or spacing of tokens in the input for the model may not matter, while in other cases the sequencing may be significant. Depending on the application for which the classifications are being generated, one or more operations may be performed based on the classification results in various embodiments. For example, in the bug report analysis scenario discussed above, if a bug report submitted in Japanese is identified (using a substitute English text collection generated using ITCs) as belonging to the "performance problem" class using a classifier trained using training examples expressed in English, the bug report may be transmitted to a performance analysis department for further translation/analysis.

Using the above technique, in various embodiment only a single classification model may need to be trained (using training data in a single language) even if text in multiple languages has to be processed; in effect, a text substitution or mapping layer may be added to adapt the trained model to support different languages. The resources and delays associated with obtaining labeled training data in multiple languages, and then training respective versions of the classification models for the respective languages, may thereby be avoided in such embodiments.

In some embodiments, a different type of classification model may be used to obtain the influential token combinations (ITCs) than is eventually used for classifying text collections in a production environment. For example, ITCs may be obtained by analyzing the weights assigned to various tokens by a regression-based classification model (e.g., a logistic regression model) trained using text collections in a particular language, while a neural network model (also trained using the same language) may be used for generating classification results for input in various languages in production. Such an approach may be taken, for example, in one embodiment if it is easier to extract ITCs from the first type of model than the second, while the second type of model produces higher-quality classification results. In other embodiments, the same type of model may be used for ITC identification as well as production-level classification.

As mentioned above, in some embodiments, embedding vectors for words or tokens of different languages may be obtained and used for similarity analysis. Individual words or groups of words in a given language may be mapped to data structures which represent the corresponding semantics numerically. For example, in one embodiment a high-dimensional vector representation or embedding may be created for each word of a selected dictionary using a neural network-based technique, such that the Euclidean distances between the vectors for a pair of words with similar meaning is in general smaller than the Euclidean distances between the vectors for a pair of words with dis-similar meaning. In such an embodiment, such Euclidean distances may be used to generate similarity scores or metrics between ITCs and CCTC tokens (e.g., with learned translation matrices potentially used to transform the vectors of the ITCs into a version suitable for distance comparisons with the CCTC vectors). In one embodiment, data structures other than vectors may be used for representing the words, and distance metrics may be computed for such other data structures to indicate similarity. In some embodiments, machine translation algorithms, which may also employ neural networks in some cases, may be used to translate the tokens of the ITCs into tokens in the target language, and such machine-translated tokens may be used for the similarity analysis. In one embodiment, linguists or other experts may help to provide at least some of the ITC token translations, e.g., with the assistance of subject matter experts in the problem domain being considered.

In one embodiment, the influential token combinations (ITCs) may comprise a consecutive group of one or more tokens in the training data language. In other embodiments, a given ITC may comprise some number of non-consecutive tokens. For example, in a word sequence W1-W2-W3-W4, W1 and W4 may be considered influential tokens, while W2 and W3 may be considered irrelevant tokens; as such, the occurrence of the sequence W1-W5-W6-W4 may be as influential in determining the class of the text collection as the sequence W1-W2-W3-W4.

In at least one embodiment, the adaptation of classification models for different languages analysis may be performed using resources of a provider network or public cloud environment. In one such embodiment, such adaptations may be performed at a network-accessible machine learning service or at a network-accessible model adaptation service of the provider network. Such network-accessible services may implement various types of programmatic interfaces to enable clients to submit requests for classification of input text in various languages, model training and/or adaptation of existing models as discussed below in further detail. In at least one embodiment, a standalone tool implemented at one or more computing devices, which implements model language adaptation techniques similar to those described above without using provider network resources may be used—that is, the use of a provider network is not a requirement for the techniques described herein.

Example System Environment

FIG. 1 illustrates an example system environment in which text-based machine learning classification models may be efficiently adapted to process input data expressed in multiple languages, according to at least some embodiments. As shown, system 100 comprises various resources and artifacts of a machine learning model adaptation service 120. Starting with a set of raw text data sources 102 pertaining to a particular problem domain for which classification is to be performed, such as data sources 112A and 112B, a labeled training data set 120 may be generated in the depicted embodiment. The labeled training data set 120 may comprise text collections (e.g., collections of words) in a source language L1 (e.g., English). Depending on the application for which the classification is to be performed, sources 112A may include, for example, a corpus of collected e-mails, comments on a web-site, records of interactions with voice controlled devices, queries submitted via a programmatic interface, blog contents, contents of books or publications, and so on. In at least some embodiments, the raw text collections may be transformed using various techniques, such as case normalization, punctuation removal, stemming, etc., before being included in the labeled training data set 120. In various embodiments, the labels may be generated with the help of subject-matter experts. In one embodiment, at least some of the labels may be generated using a natural language understanding algorithm.

Using a set of training resources 124 (e.g., one or more computing devices), a trained classification model 126 whose input is expected to be expressed in the source language L1 may be generated in the depicted embodiment. After classification model 126 has been trained, it may be used to identify predicted classes for post-training input text collections 160 expressed in the source language L1. The choice of the source language L1 may be made in some embodiments, for example, based on the volume of training examples that can be obtained: for example, if more examples pertaining to the problem domain of interest are available in Chinese than in English, Chinese may be selected as the source language.

In various embodiments, in order to adapt the trained classification model 126 to handle input in different languages, a set of influential token combinations (ITCs) may be obtained by analyzing the trained classification model 126. For example, if a logistic regression model is being used for classification, the weights or coefficients associated with different various tokens (or features derived from the tokens) may be examined within the training data examples which are mapped to a particular class C1, and combinations of tokens whose presence is highly correlated (e.g., with coefficients above a selected threshold) with the C1 class prediction may be identified as ITCs with respect to C1. An ITC extractor 130 implemented using one or more computing devices may store the ITCs associated with various classes (expressed in source language L1) in a database 132 in the depicted embodiment. It is noted that at least in one embodiments, one or more ITCs may be identified using other sources—e.g., some ITCs may be obtained by analyzing results of other models, or from subject matter experts, and not all the ITCs may necessarily be extracted from the trained classification model 126.

A similarity analysis algorithm (or multiple similarity analysis algorithms which may be used in combination) may be selected in various embodiments to provide metrics for semantic similarity between text combinations expressed in languages other than L1 and the ITCs identified from the trained classification model. When a classification candidate text collection (CCTC) 150 in a different language L2 is received for processing, a similarity analyzer 134 may utilize the selected algorithm(s) to determine whether the similarity metric or score between one or more ITCs and various text tokens of the CCTC exceed a threshold in the depicted embodiment. A variety of similarity analysis algorithms may be used singly or in combination in different embodiments, such as embedding vector based similarity algorithms, machine translation based algorithms, and so on.

Based at least in part on the outcome of the similarity analysis, a substitute text collection 142 (expressed in language L1) may be produced with respect to a given CCTC 150 in the depicted embodiment. The substitute text sequence may comprise one or more tokens of ITCs which have high similarity metrics with respect to the CCTC, for example. The amount and sequencing of text tokens included in the substitute text collections may vary in different embodiments, e.g., based at least partly on the sensitivity to sequencing of the trained classification model 126. For some types of classification models (e.g., logistic regression or other regression-based models), it may be sufficient to just include tokens of highly-similar ITCs. For other types of classification models (such as recurrent neural network-based models) the relative positioning of tokens within a text sequence may be important, so filler tokens or words may be introduced into the substitute text collections as discussed below in further detail, in addition to the tokens of the ITCs with high levels of similarity.

The substitute text collection 142 may be provided as input to the trained classification model 126 in the depicted embodiment, in place of the corresponding CCTC 150 (which was expressed in a language other than L1, and so could not have been used directly as input for the trained classification model), and a corresponding predicted class 170 may be identified for the CCTC. Based on the class that is identified, one or more actions may be initiated in various embodiments—e.g., the CCTC may be directed to one of several possible destinations for further analysis and/or processing.

In at least some embodiments, the MLAS 120 may implement one or more programmatic interfaces 177 which may be used by clients 180 to interact with the MLAS. Such programmatic interfaces 177 may, for example, comprise a set of application programming interfaces (APIs), a web-based console, one or more command-line tools, a graphical user interface or the like in various embodiments. A programmatic interface 177 may be used, for example, to submit a CCTC in a particular language to the MLAS, to request training or preparation of a classification model to be used with input expressed in multiple languages, and/or to request the adaptation of an already-trained classification model for a particular language or set of languages.

In various embodiments, implementations of each of the trained classification models 126 may, for example, include memory for storing input values and parameters and computer-executable instructions for an initial set of computations on the input values. In some embodiments (e.g., if a neural-network based model is used), intermediary layers of the model may include memory storing computer-executable instructions and/or data for manipulating the results of the initial computations and determining values to be transmitted to an output layer. An output layer of the model may in turn include memory and/or computer-executable instructions for generating and/or storing output values such as the scores or probabilities associated with predicted classes. Any of a number of types of data structures may be used for storing data and/or implementing the algorithm logic, e.g., including various tree-based structures as well as data structures optimized for storing matrices, vectors, arrays, hash tables and the like. Similarly, memory storing computer-executable instructions may be used for the influential token combination extractor 130, the similarity analyzer 134, and/or the substitute text generator 138 in various embodiments. A variety of data structures optimized for storing matrices, vectors, arrays, hash tables and the like may also be employed at the influential token combination extractor 130, the similarity analyzer 134, and/or the substitute text generator 138 in different embodiments.

Influential Token Combination Types

Figure 2:
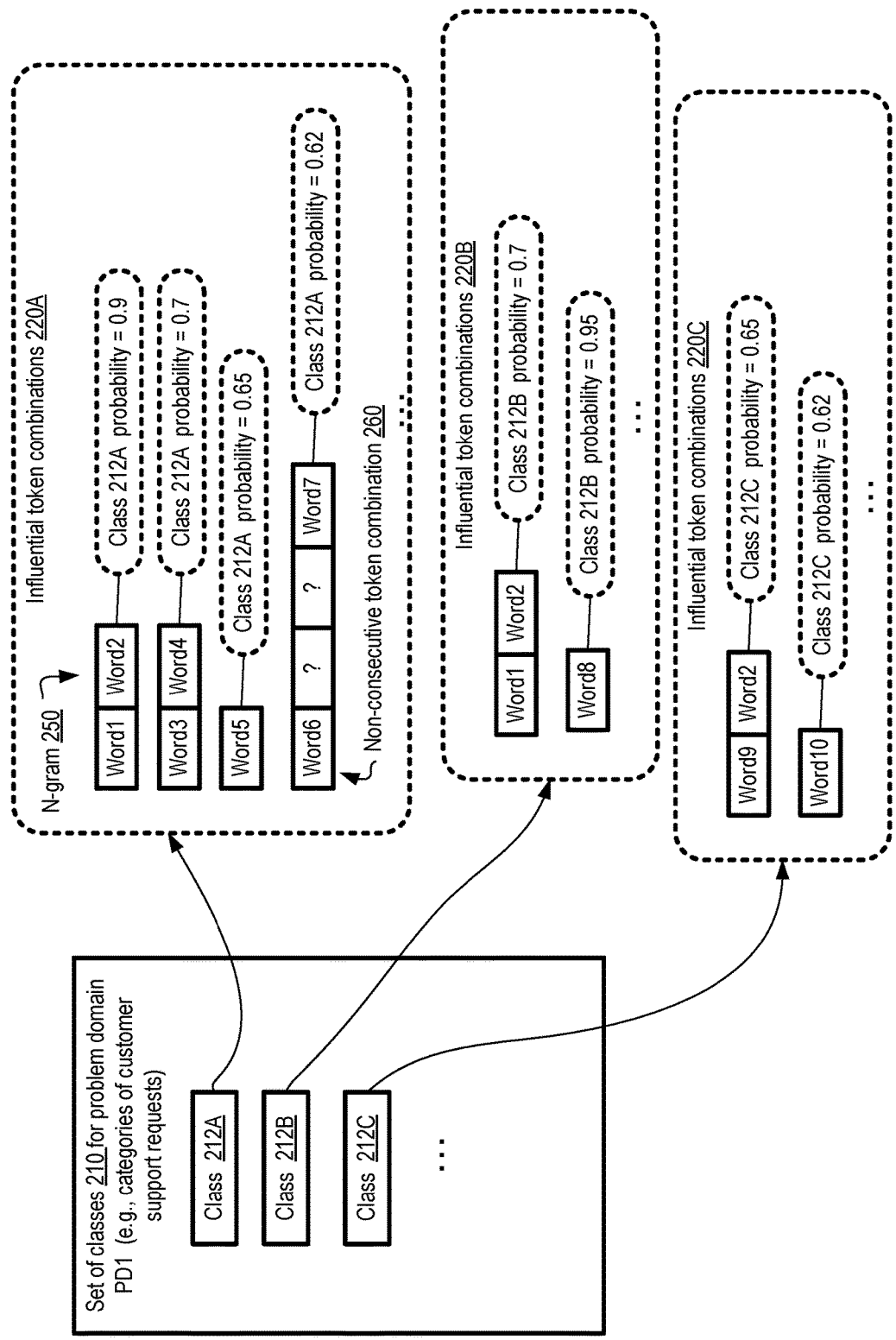
FIG. 2 illustrates examples of types of influential token combinations which may be generated from input text, according to at least some embodiments.

FIG. 2 illustrates examples of types of influential token combinations which may be generated from input text, according to at least some embodiments. The trained classification model(s) for a given application or problem domain PD1 (such as customer support requests) may designate individual text collections as examples of one or more of a set of classes 210 in the depicted embodiment, such as class 212A, class 212B or class 212C in the depicted embodiment.

With respect to at least some of the classes, a respective set of influential token combinations (ITCs) 220 may be identified based on the analysis of the trained classification model (e.g., in the case where a regression model is being used, by examining the weights or coefficients assigned to individual tokens which occur frequently in the text collections designated as examples of the class). For example, ITCs 220A may be identified for class 212A, ITCs 220B may be identified for class 212B, and ITCs 220C may be identified for class 220C. In the depicted example scenario, ITCs may comprise individual words, consecutive sequences of multiple words (n-grams with n>=2), and/or non-consecutive token combinations. Any of a number of tools for analyzing the internal elements of a machine learning model (such as weights which may not necessarily be exposed during normal usage) may be used to identify ITCs in different embodiments.

Each of the ITCs may have an associated probability or score indicating in the depicted embodiment, indicating how likely it is that the presence of the ITC in a given text collection would result in the designation of the text collection as an example of the class with which the ITC is associated. For example, with respect to class 212A, the occurrence of n-gram 250 (with n=2) comprising Word1 followed by Word2 is associated with a 0.9 (90%) probability of classification as an example of class 212A, the occurrence of Word3 followed by Word4 is associated with a 0.7 (70%) probability, the occurrence of Word5 is associated with a 0.65 (65%), while the occurrence of Word6 followed after two intervening words by Word? (the "?" symbols indicate that any words/tokens may be positioned in the indicated positions) is associated with a 0.62 (62%) probability. It is noted that the precise probabilities may not necessarily be computed in at least some embodiments—e.g., if a strong correlation between the presence of a set of tokens and the class identified for a text collection is identified, that set of tokens may be designated as an ITC, without necessarily computing the corresponding probability.

As shown in FIG. 2, the tokens of ITCs associated with a given class may have some overlap with the tokens of ITCs associated with other classes in at least some embodiments. For example, the bi-gram Word1-Word2 occurs in ITCs 220A and 220B, and Word2 also occurs as part of a different bi-gram in ITCs 220C. ITCs 220 obtained from analysis of the trained classification model, and/or the associated probabilities may be stored in an ITC database in some embodiments. In one embodiment, the model language adaptation service may implement programmatic interfaces allowing clients to view the ITCs and/or associated probabilities, which may help to increase client confidence in the accuracy of the analysis. In some embodiments, as mentioned above, probabilities associated with individual ITCs may not be computed, stored or made accessible. In one embodiment, metrics other than probabilities as such (e.g., correlation coefficients) may instead be computed and/or stored for the different influential token combinations.

Algorithms Used for Similarity Analysis and Classification

Figure 3:
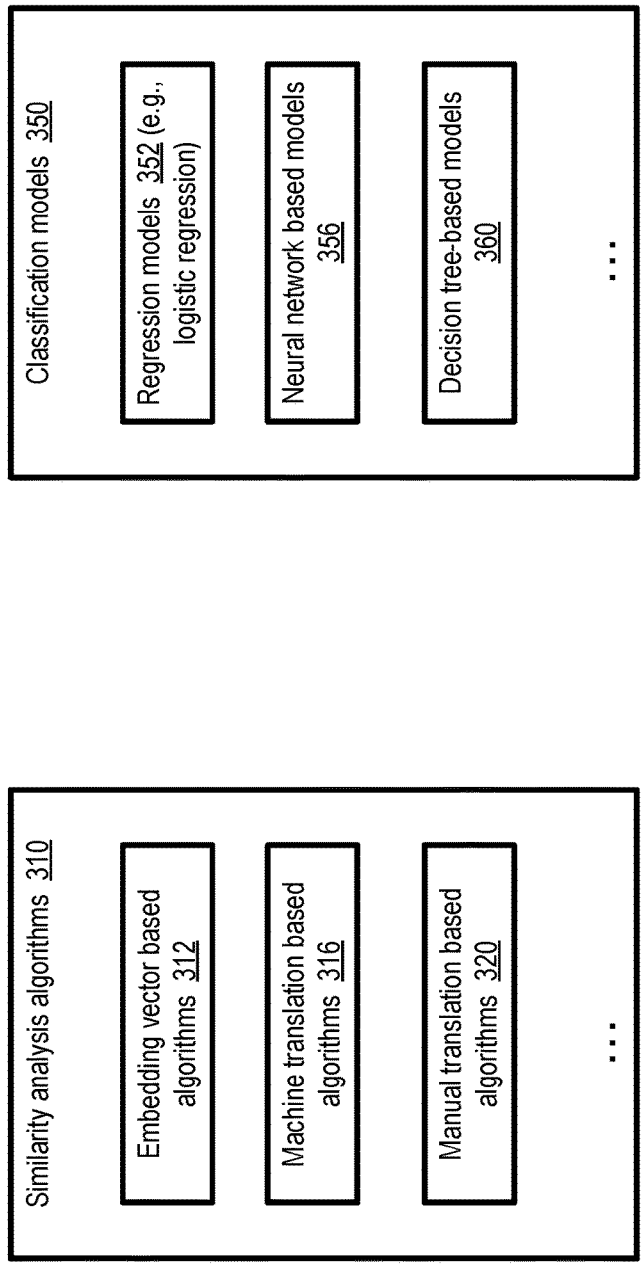
FIG. 3 illustrates examples of similarity analysis algorithms and classification algorithms which may be employed for machine learning problems in which input text may be in multiple languages, according to at least some embodiments.

FIG. 3 illustrates examples of similarity analysis algorithms and classification algorithms which may be employed for machine learning problems in which input text may be in multiple languages, according to at least some embodiments. Any combination of one or more similarity analysis algorithms 310 may be utilized in different embodiments. In at least one embodiment, respective sets of embedding vectors may be generated to represent the semantics of individual words or tokens in the source language and the target language(s), and such vectors may be employed in algorithms 312, as discussed below with respect to FIG. 4. In other embodiments, machine translation algorithms 316 may be used—e.g., machine translations of at least some of the identified ITCs may be generated for the target language(s), and the extent to which matches between the machine-translated OTCs and the content of the target language text collections are detected may be used to compute metrics of similarity. In one embodiment, manual translation based algorithms 320 may be used—e.g., individuals proficient in the target language(s) may generate translations of ITCs, and matching-based similarity metrics may then be generated automatically between the translated ITCs and the candidate text collections in target languages.

Any combination of one or more classification algorithms 350 may be used in different embodiments. In some embodiments, regression models 352 (e.g., logistic regression models) may be used. In other embodiments, neural network based models 356 may be employed. In some embodiments, decision tree based models 360 may be used.

Figure 4:
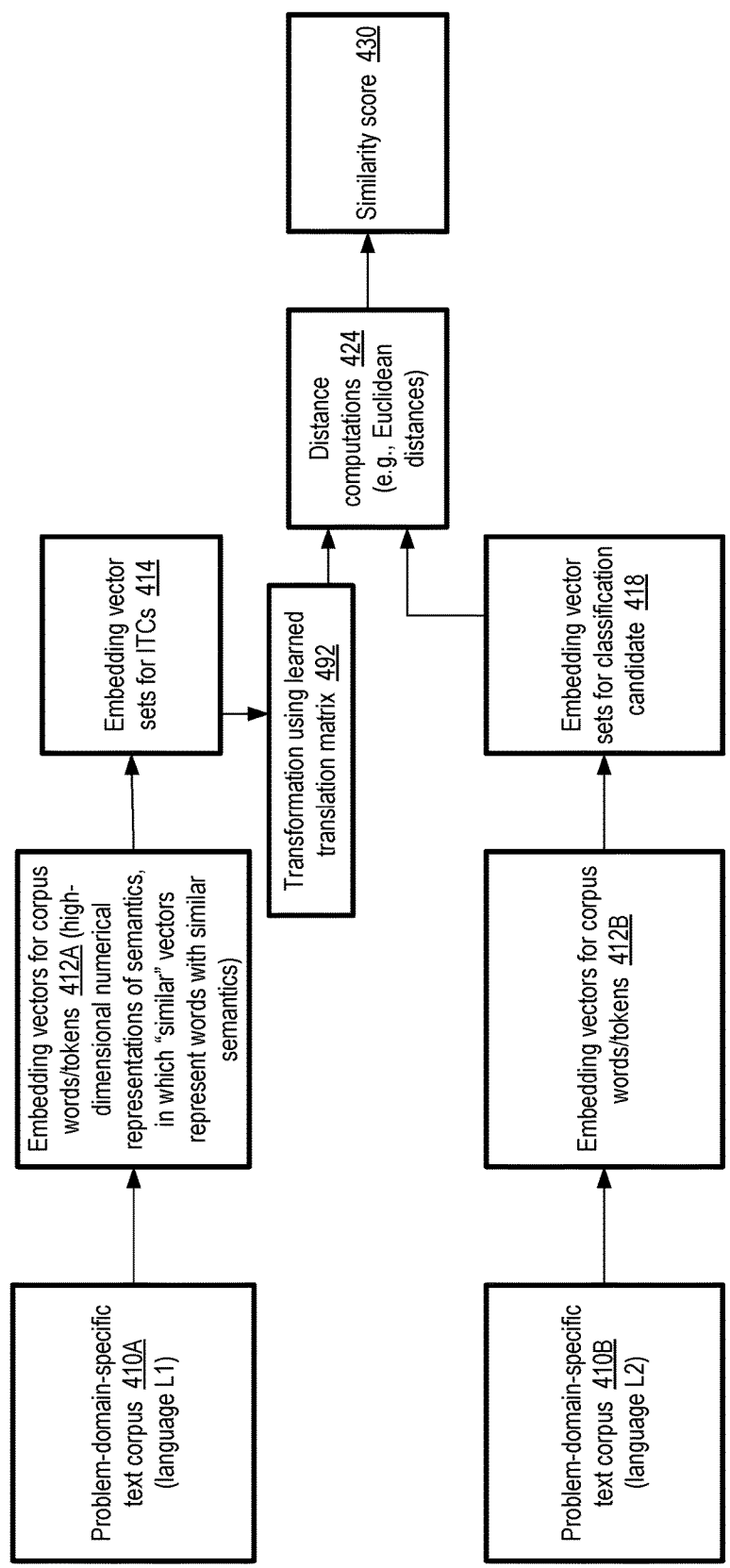
FIG. 4 illustrates an example of the use of embedding vectors to identify substitute text for an input text record, according to at least some embodiments.

FIG. 4 illustrates an example of the use of embedding vectors to identify substitute text for an input text record, according to at least some embodiments. In the depicted embodiment, a respective problem-domain specific text corpus 410 may be obtained for the application being considered in the source language and one or more target languages. For example, text corpus 410A expressed in language L1 may be obtained, and text corpus 410B expressed in language L2 may be obtained. Using the respective text corpuses, a set of embedding vectors 412A may be generated in various embodiments with respect to each of the languages. Within a given set of embedding vectors such as 412A or 412B, the semantics of individual words/tokens or groups of tokens may be represented as high-dimensional numerical vectors (e.g., vectors with tens or hundreds of real numbers as elements), such that similar vectors represent words (or word groups) with similar semantics. In some embodiments, neural networks may be used to generate the embedding vectors (e.g., a neural network may be trained to predict the next word in a sequence or sentence, and the weights assigned to individual words within the trained neural network may be used as vector elements).

Embedding vector sets 414 corresponding to the influential text tokens of language L1 for the problem domain PD1 may be identified from the corpus-level embeddings 412A in the depicted embodiment. Corresponding to a given classification candidate text collection expressed in language L2, the embedding vector sets 418 may be identified from the corpus-level embedding vectors 412B of the target language. Distances between the vector sets 414 and 418 may be computed, as indicated in element 424, and used as the similarity metrics employed to create substitute text collections in the depicted embodiment. In at least some embodiments in which the embedding vectors comprise real numbers and/or integers, a transformation 492 may be applied to the L1 vectors using a learned translation matrix, so that more meaningful Euclidean distances between the vectors of sets 414 and 418 may be computed. For example, in one embodiment, a translation matrix may be learned at the model language adaptation service via machine learning algorithms using seed pairs of word/token translations between L1 and L2, and the L1 vectors may be multiplied by the translation matrix to obtain a transformed version of the L1 vectors for the distance computations with respect to L2 vectors. It is noted that in some embodiments, a translation matrix may not be required. In embodiments in which Euclidean distances are computed, smaller distances (indicating that token combinations in the two languages are close to each other in the multi-dimensional vector space, and therefore may be expected to have similar semantics) may be mapped to higher similarity scores. Other types of distance metrics may be used in some embodiments.

Substitute Text Collection Examples

Figure 5:
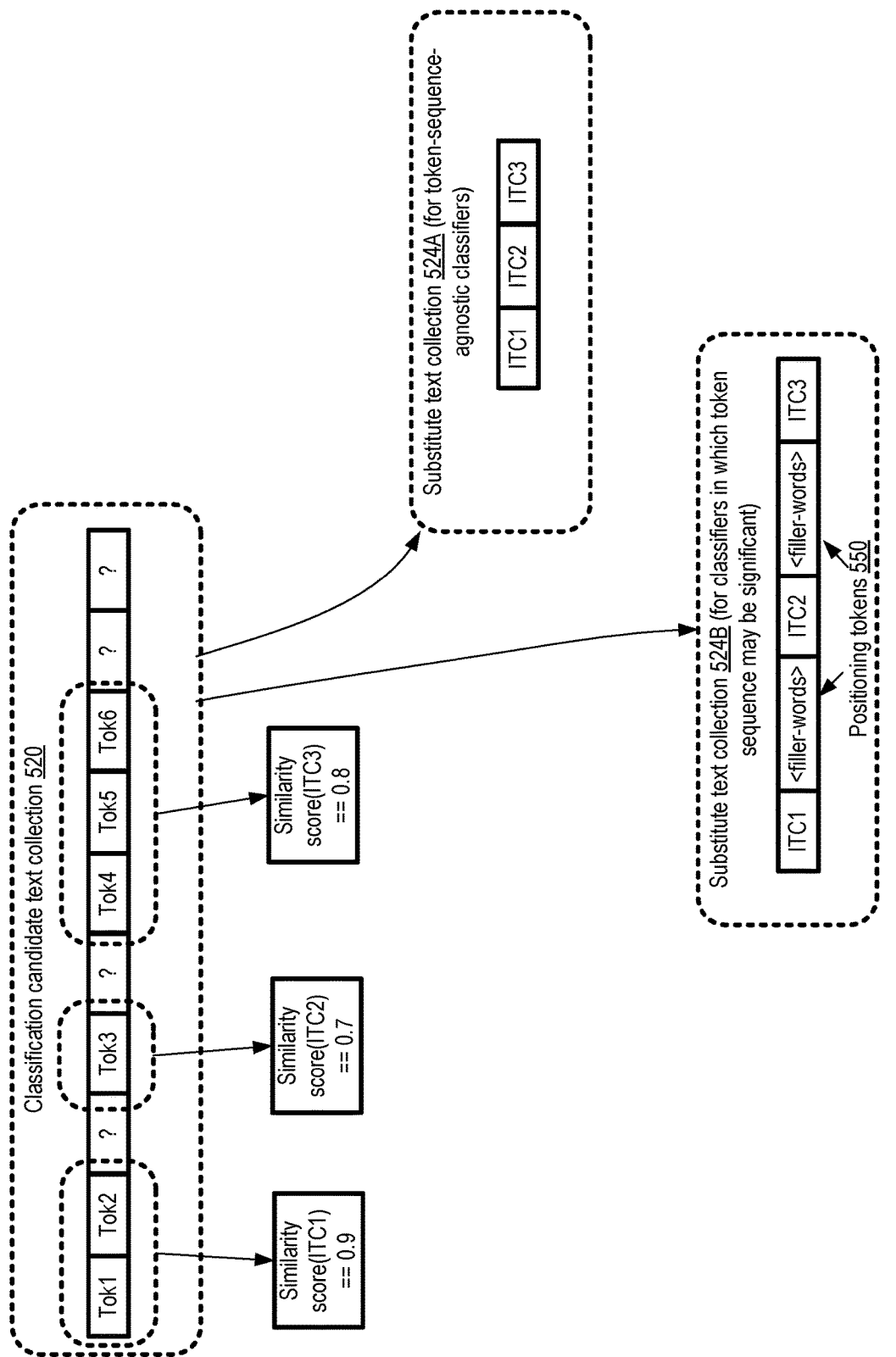
FIG. 5 illustrates examples of types of substitute text collections which may be generated for classifiers, according to at least some embodiments.

As indicated earlier, in various embodiments, substitute text collections (in the source language for which the classification model(s) are trained) may be generated corresponding to classification candidate text collections in a target language. FIG. 5 illustrates examples of types of substitute text collections which may be generated for classifiers, according to at least some embodiments.

In the example scenario shown in FIG. 5, respective similarity scores between three subsets of a classification candidate text collection 520 and influential token collections ICT1, ICT2 and ICT3 are shown. The combination of tokens Tok1 and Tok2 has a similarity score of 0.9 with respect to ICT1. Tok3 has a similarity score of 0.7 with respect to ICT2, while the token combination Tok4-Tok5-Tok6 has a similarity score of 0.8 with respect to a third ICT, ICT3. Higher similarity scores are assumed to indicate greater similarity in the depicted embodiment, and each of the three token combinations in the CCTC 520 are assumed to have similarity scores high enough for the corresponding ICT tokens to be included in the substitute text collection.

In some embodiments, the trained classification model(s) to which the substitute text collections are to be provided as input may not be sensitive to the relative positioning or sequencing of tokens. For example, the classification result generated if the tokens of the three ICTs are arranged in the sequence ICT1-ICT2-ICT3 may be the same as (or very similar to) the classification result generated if the sequence(s) ICT1-ICT3-ICT2, ICT2-ICT1-ICT3, ICT2-ICT3-ICT1, ICT3-ICT1-ICT2, or ICT3-ICT2-ICT1 were used as input. Furthermore, in at least some embodiments the presence or absence of other tokens (which are not among the influential set of tokens identified for the problem domain) may make little difference to the classification results obtained via such token-sequence-agnostic classifiers. If such a token-sequence-agnostic classification algorithm is being used, a substitute text collection similar to 524A, comprising just the tokens of the ITCs with high similarity, may be generated in the depicted embodiment. In at least some embodiments, one or more regression-based classification models may be token-sequence-agnostic.

In at least one embodiment, the sequence or positioning of tokens in the input text records may be significant for the classification model—e.g., in the case of certain types of neural network based models, word order in the input text may influence the classification result. In some embodiments in which such models are being used for classification, filler words or tokens may be included in the substitute text collections, in addition to the tokens of the ITCs themselves, and/or the relative positioning of the ITC tokens themselves may be determined based on the grammatically or semantically-expected positions of the ITC tokens themselves. Substitute text collection 524B shows filler words inserted between ICT1 and ICT2, and also between ICT2 and ICT3. The filler words or tokens may termed positioning tokens 550 in various embodiments, and their inclusion within the substitute text collections may result in placing one or more tokens of the ITCs at targeted offsets within the substitute text collection 524B in the depicted embodiment.

Figure 6:
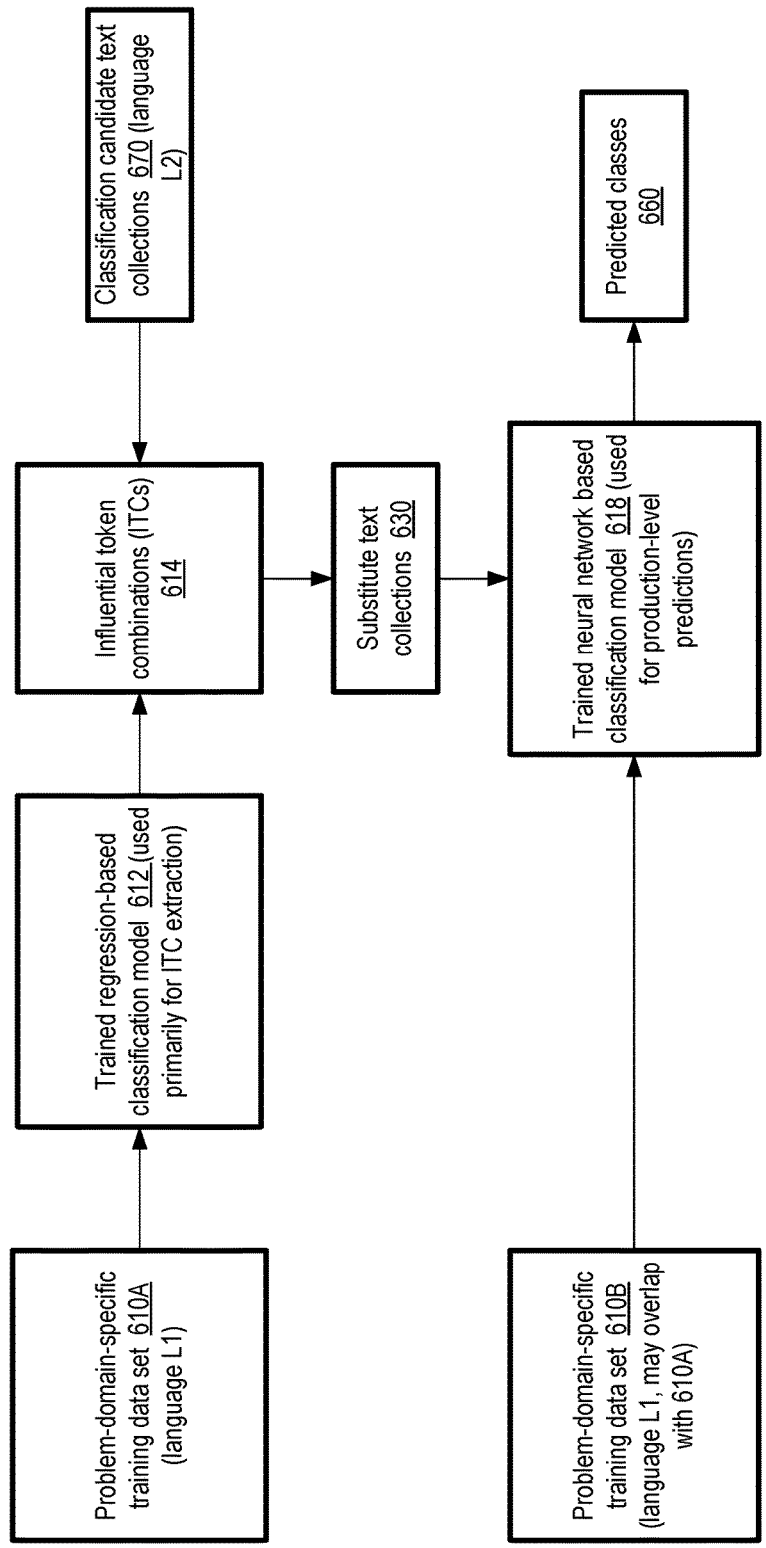
FIG. 6 illustrates an example scenario in which influential token combinations are determined using one machine learning model, while substitute text collections generated using the influential token combinations are provided as input for a second machine learning model, according to at least some embodiments.

In some embodiments, the filler words or positioning tokens may be generated automatically based on language-specific grammar or other rules. In at least one embodiment, machine translation may be used to generate the filler words—e.g., the tokens in the CCTC 520 which did not have high similarity scores (such as tokens indicated by the "?" symbol in FIG. 5) may be passed as input to a machine translation algorithm for translation into the source language used for the substitute text collection, and the output of the machine translation algorithm may be used as the filler words. Other approaches towards ordering the ICTs relative to one another, and positioning the tokens of the ITCs relative to one another, may be taken in some embodiments.
Different Models for ITC Extraction and Production-Level Classification FIG. 6 illustrates an example scenario in which influential token combinations are determined using one machine learning model, while substitute text collections generated using the influential token combinations are provided as input for a second machine learning model, according to at least some embodiments. In the depicted embodiment, a problem-domain-specific training data set 610A in a source language L1 may be used to train a regression-based classification model 612. After the regression model has been trained, it may be analyzed in the depicted embodiment to obtain a set of influential token combinations 614 as described earlier.

The regression-based classification model 612 may be used primarily to identify the ITCs in some embodiments. A different model, such as a neural network based model 618, may be used for performing production-level classifications in such embodiments. As shown, using similarity analysis algorithms and the ITCs 614, substitute text collections 630 corresponding to classification candidate text collections 670 in a target language may be generated and then provided as input to the neural network based model 618 to determine corresponding predicted classes 660.

Figure 7:
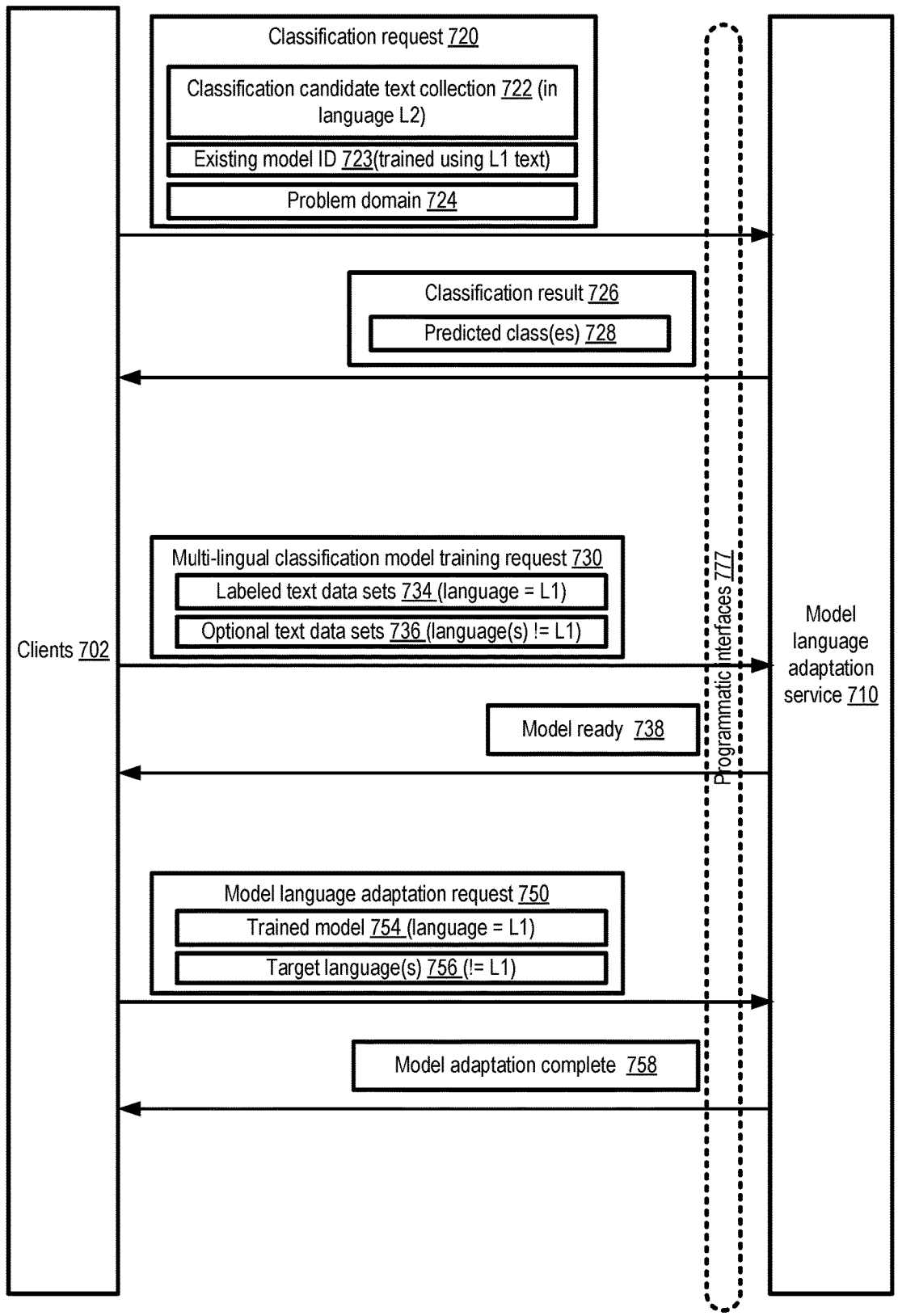
FIG. 7 illustrates example programmatic interactions between a client and a model language adaptation service, according to at least some embodiments.

In the depicted embodiment, the neural network based model 618 may be trained using a different training data set 610B (which may for example differ in size from the training data set 610A used for training the regression-based classification model). In other embodiments, the same training data may be utilized for both the classification models. A neural network-based model may provide a superior quality of classification than a regression-based model in some embodiments, and may therefore be preferred for production-level classification. In contrast, for the purpose of extracting ITCs, a regression-based model may be easier to use in some embodiments than a neural network-based model. The tokens which are identified as having high significance or influence on classification results obtained from the regression-based model may be assumed to also be significant for the neural network-based model in the depicted embodiment, even though the techniques used for classification may differ between the two types of models. In some embodiments, production-level classification may be performed using more than one type of model—e.g., results for a given classification candidate text collection 670 may be combined from both models.
Example Programmatic Interactions FIG. 7 illustrates example programmatic interactions between a client and a model language adaptation service, according to at least some embodiments. As mentioned earlier, in at least some embodiments one or more programmatic interfaces 777 may be implemented by a model language adaptation service 710 to enable clients 702 to submit various types of requests and receive corresponding responses. The programmatic interfaces may comprise, for example, one or more web-based consoles, graphical user interfaces, application programming interfaces (APIs) and/or command line tools in various embodiments.

In the depicted embodiment, at least three types of requests may be submitted programmatically by clients 702 to the model adaptation service 710. For example, a classification request 720 indicating a candidate classification text collection 722 (in some target language L2) may be submitted to the MLAS 710. In some embodiments, the classification request may indicate an identifier 723 of an existing model for the problem domain (which was trained using text expressed in some other source language L1), and/or information about the problem domain 724 may be provided in the request 720. In response, the MLAS 710 may identify one or more trained classification models for the problem domain, or use the provided model identifier to select the model to be used. In some embodiments, the language of the CCTC 722 may be automatically detected by the MLAS 710; in other embodiments, the language may be indicated in the request 720. If the trained model has already been adapted for the target language in which the CCTC is expressed, a classification result 726 comprising an indication of the predicted class(es) 728 to which the CCTC belongs may be provided using a generated substitute text collection as input to the adapted model in the depicted embodiment.

If the classification model has not yet been adapted for the language of the CCTC 722, the techniques described above may be implemented to adapt the model—e.g., including generating influential token combinations if the ICTs have not already been obtained, identifying the similarity algorithms to be used, obtaining the metadata such as embedded vectors etc. to be used for similarity analysis, selecting the substitute text collection generation approach and so on. After the model has been adapted, a substitute text collection for the CCTC 720 may be generated using similarity scores with respect to the ITCs, and submitted as input to the adapted version of the model to obtain the predicted classes 728. (Of course, it may be the case that the CCTC 720 is already in the language for which the classification model was trained, in which case no adaptation may be required.)

In a second type of programmatic interaction, a client 702 may submit a multi-lingual classification model training request 730 to the MLAS 710 in the depicted embodiment. Such a request may, for example, include pointers to labeled text data sets 734 in a source language, to be used as the training data for one or more classification models. In some embodiments, a model training request 730 may also include optional text data sets 736 in the target language or languages for which the multi-lingual model is to be adapted, e.g., for use in generating embedding vectors or the like. The MLAS may use the labeled training data 734 to train one or more classifiers, and adapt it to the targeted languages using the techniques described earlier. After the artifacts used for supporting the target languages (such as ITCs, embedding vectors etc.) have been generated, a model ready message 726 may be transmitted to the client in the depicted embodiment.

Clients may also or instead submit model language adaptation requests 750 via programmatic interfaces 777, requesting that a specified model 754 which has already been trained be adapted to one or more specified target languages 756. In response to such a request, the artifacts needed for classifying input text in the target languages 756 may be generated at the MLAS 710 using the techniques discussed above, and a model adaptation complete response message 758 may be transmitted to the client 702.

The request parameters associated with the kinds of requests shown in FIG. 7 may differ from those indicated in FIG. 7 in some embodiments—for example, clients may provide guidance regarding the types of models to be trained, values for various meta-parameters such as similarity analysis algorithm choices, and so on. Other types of programmatic interactions may be supported by an MLAS 710 in various embodiments, while one or more of the types of requests indicated in FIG. 7 may not necessarily be supported.

Provider Network Environment

Figure 8:
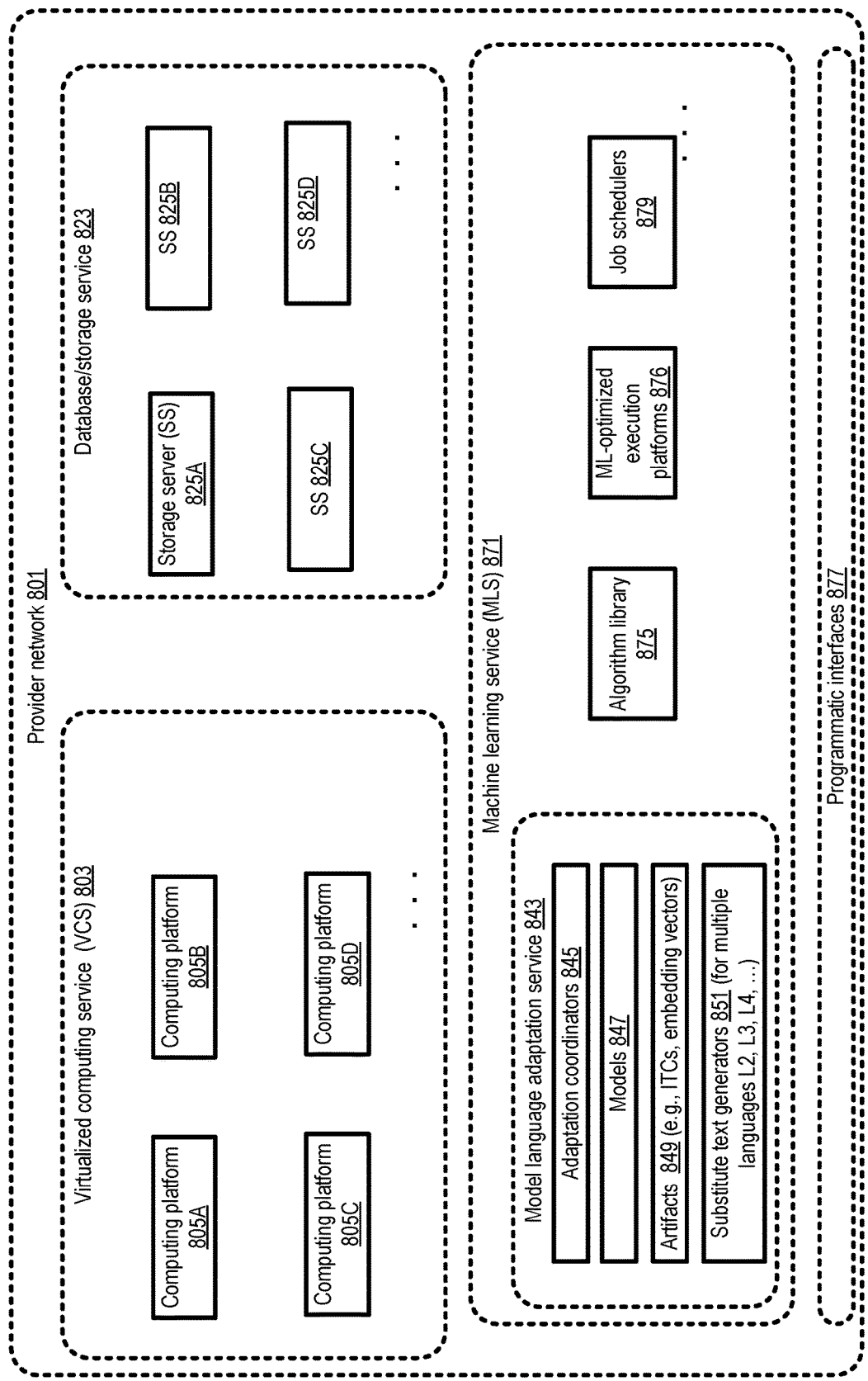
FIG. 8 illustrates a provider network environment at which a machine learning service may be implemented, according to at least some embodiments.

In some embodiments, the techniques discussed above for adapting classification models for multiple languages may be implemented at a network-accessible machine learning service. FIG. 8 illustrates a provider network environment at which a machine learning service may be implemented, according to at least some embodiments.

Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

In the depicted embodiment, provider network 801 may comprise resources used to implement a plurality of services, including for example a virtual computing service 803, a database or storage service 823, and a machine learning service 871. The machine learning service 871 may comprise a model language adaptation service 843 in some embodiments; in other embodiments, the model language adaptation service may be implemented as a separate service of the provider network. Components of a given service may utilize components of other services in the depicted embodiment—e.g., for some machine learning tasks, a component of the machine learning service 871 may utilize virtual machines implemented at computing platforms such as 805A-805D of the virtualized computing service. Input data, intermediate results, final results and/or other artifacts of various machine learning algorithms or models may be stored at storage servers 825 (e.g., 825A-825D) of the database or storage service 823 in some embodiments. Individual ones of the services shown in FIG. 8 may implement a respective set of programmatic interfaces 877 which can be used by external and/or internal clients (where the internal clients may comprise components of other services) in the depicted embodiment.

As shown, the model language adaptation service 843 may comprise, among other components, one or more adaptation coordinators 847 responsible for implementing workflows for training and adapting classification models for multiple languages. An adaptation coordinator 847 may, for example, invoke algorithms selected from the machine learning algorithm library 875 to train models 847, to extract or generate artifacts 849 (such as influential token combinations, embedding vectors etc.), select algorithms for similarity analysis, and so on in the depicted embodiment. For each target language, a respective substitute text generator 851 may be used in the depicted embodiment. In some embodiments, requests to train and/or adapt machine learning models may be handled as batch jobs at the machine learning service, and a batch job scheduler 879 may orchestrate the allocation of resources for the jobs as well as dependencies among jobs. In at least one embodiment, a machine learning service 871 may have access to or include a set of execution platforms 876 that are optimized for machine learning tasks (e.g., platforms that have customized hardware such as GPU arrays and/or customized software stacks). Depending on the suitability of such platforms for model language adaptation tasks and/or the types of classifiers used for the problem domains of interest, one or more execution platforms 876 may be employed in the depicted embodiment.

In at least some embodiments, the model language adaptation techniques discussed earlier may be accomplished using non-specialized computing platforms of the virtualized computing service. In various embodiments, the training and test/evaluation data used for various models may be stored at a database/storage service 823. As mentioned earlier, the techniques for model language adaptation described above may be implemented without acquiring resources of network-accessible services such as those shown in FIG. 8 in at least some embodiments. For example, a standalone tool implemented at one or more computing devices which are not part of a network-accessible service may be used in some embodiments.

Methods for Training Data Analysis

Figure 9:
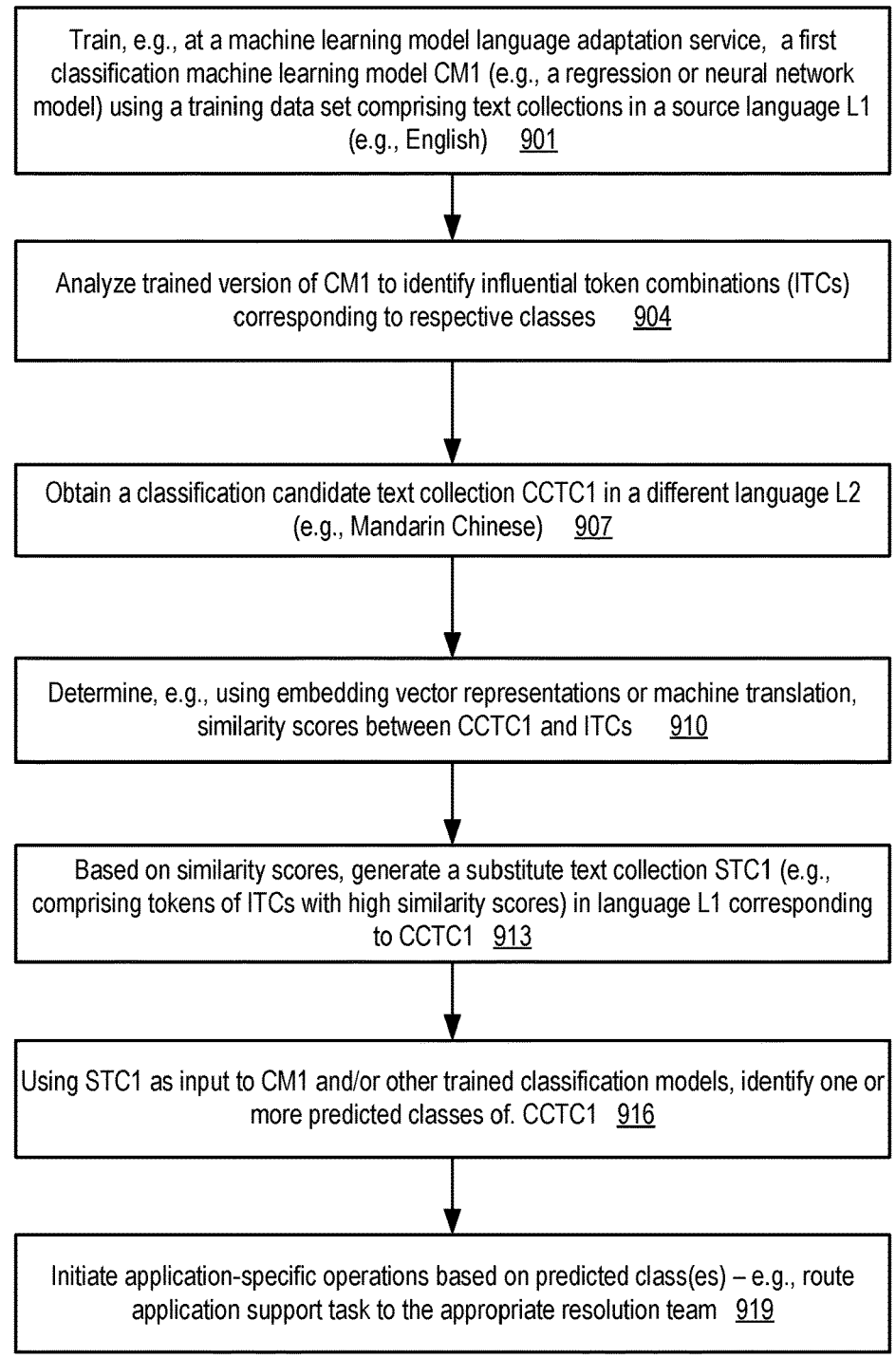
FIG. 9 is a flow diagram illustrating aspects of operations that may be performed to adapt machine learning models to handle input text in multiple languages, according to at least some embodiments.

FIG. 9 is a flow diagram illustrating aspects of operations that may be performed to adapt machine learning models to handle input text in multiple languages, according to at least some embodiments. As shown in element 901 a first classification machine learning model CM1 may be trained using a training data set comprising labeled text collections in a source language L1. Any of various model types may be trained, such as regression-based models, neural-network based models and the like in different embodiments. The training data may, for example, comprise text obtained from emails, social media, publications, medical status submission tools, and the like, depending on the problem domain for which the classification is to be performed. The raw text may be processed in one or more ways (e.g., by eliminating punctuation, case normalization, etc.) in some embodiments before being included in the training data. The labels or classes designated for the training data examples may be selected, for example, by problem domain experts. After it is trained, CM1 may generate a predicted class (or respective classification scores for several different classes, indicating the probabilities associated with each of the classes) corresponding to input text expressed in L1. In at least some embodiments, resources of (or accessible from) a network-accessible model language adaptation service of a provider network may be employed for training the model (as well as for adapting the model for multiple languages).

The trained version of CM1 may be analyzed to identify, corresponding to individual ones of the classes, a set of one or more influential token combinations (ITCs) in the depicted embodiment (element 904). The occurrence within a given text collection of a particular influential token combination associated with a given class may be correlated with at least a threshold probability of classification of that text collection as an example of that class in the depicted embodiment. The tokens of ITCs may be termed "influential" in that, relative to the other tokens which may be present in a text collection, ITC tokens may have a stronger predictive impact on the classification result for that text collection. In some embodiments, coefficients or weights assigned to different words or word groups by the trained version of CM1 may be used to identify the ITCs, e.g., with the words/groups assigned weights higher than a threshold being designated as ITC members. In some embodiments, a given ITC may comprise a sequence of up to N consecutive tokens, where N is a meta-parameter of the model adaptation procedure; in other embodiments, the tokens in an ITC need not necessarily be consecutive in the input text. In at least some embodiments, some ITCs may be obtained from sources other than the trained classification model—e.g., from analysis of other related models, or from subject matter experts. In various embodiments, additional artifacts pertaining to the ITCs may be generated to help with the adaptation of the model CM1 (and/or additional classification models which may rely on substitute text prepared using the ITCs)—e.g., in some embodiments, embedded vectors representing the tokens of the ITCs may be generated, or machine translation algorithms may be used to generate translations of the ITCs into some number of target languages.

A classification candidate text collection CCTC1, expressed in a target language L2, may be obtained in the depicted embodiment (element 907). Similarity scores or metrics between the tokens of CCTC1 and the sets of ITCs generated for the different classes may be determined in various embodiments (element 910). Any of a number of similarity analysis algorithms may be used in different embodiments—e.g., Euclidean or other distance metrics may be used to infer similarity in embodiments in which embedding vector representations of the tokens can be generated, pattern matching algorithms comparing machine translations of the ITC tokens and the CCTC1 tokens may be used, and so on.

In at least some embodiments, a substitute text collection STC1 (in the source language L1) corresponding to CCTC1 may be generated based at least partly on the similarity scores (element 913). For example, in one embodiment in which the classification models being used are not sensitive to the positioning or sequencing of input tokens relative to one another, the substitute text token may be generated by combining the tokens of ITCs which had a similarity score or metric higher than a selected threshold (with the threshold representing another meta-parameter of the technique). In other embodiments, positioning tokens (e.g., obtained using machine translations of some of the tokens of CCTC1, or randomly selected tokens in L1) which are not part of the ITCs themselves may be inserted among the ITC tokens selected for inclusion in STC1.

The substitute text collection STC1 may be provided as input to CM1 (and/or other trained classification models), and the predicted class or classes to which CCTC1 belongs may be obtained in various embodiments (element 916). One or more application-specific operations may be initiated (element 919) based at least in part on the predicted class(es). For example, if the input text collection CCTC1 that is being classified comprises application support requests submitted via e-mail or some other programmatic interface, the class predicted for CCTC1 may be used to route the request to the appropriate resolution team in some embodiments. Other types of tasks may be initiated in different embodiments.

In at least some embodiments, the techniques of identifying influential token combinations and generating substitute text collections based on similarity analysis as discussed above may be applied to adapt machine learning models other than classification models to multi-lingual input. It is noted that in various embodiments, some of the operations shown in FIG. 9 may be implemented in a different order than that shown in the figure, or may be performed in parallel rather than sequentially. Additionally, some of the operations shown in FIG. 9 or other flow diagrams may not be required in one or more implementations.

Use Cases

The techniques described above, of adapting machine learning models that have been trained using input text in a particular language, such that the trained models can process input submitted in other languages, may be useful in a variety of scenarios. For many machine learning applications including classification models, very large data sets (e.g., millions of observations) may be used for training and testing the models. Generating high-quality labels for such large data sets may be extremely time-consuming and expensive, even when problem domain experts are available to help generate the labels. In some cases, sufficient unlabeled data may not necessarily even be available in a target language to be labeled and then used to train a language-specific version of the model in a timely manner. In addition, even if labeled data were available in each language of interest, the aggregate computational cost of training respective model versions to handle numerous different languages may be quite high. By identifying a small (compared to the size of the training data) set of influential tokens in the source language of a trained model, and then using similarities between those tokens and the classification input text in various other languages to generate substitute text input in the source language, the overall time, resources and costs associated with handling text in multiple languages may be reduced substantially for many machine learning based languages.

Illustrative Computer System

Figure 10:
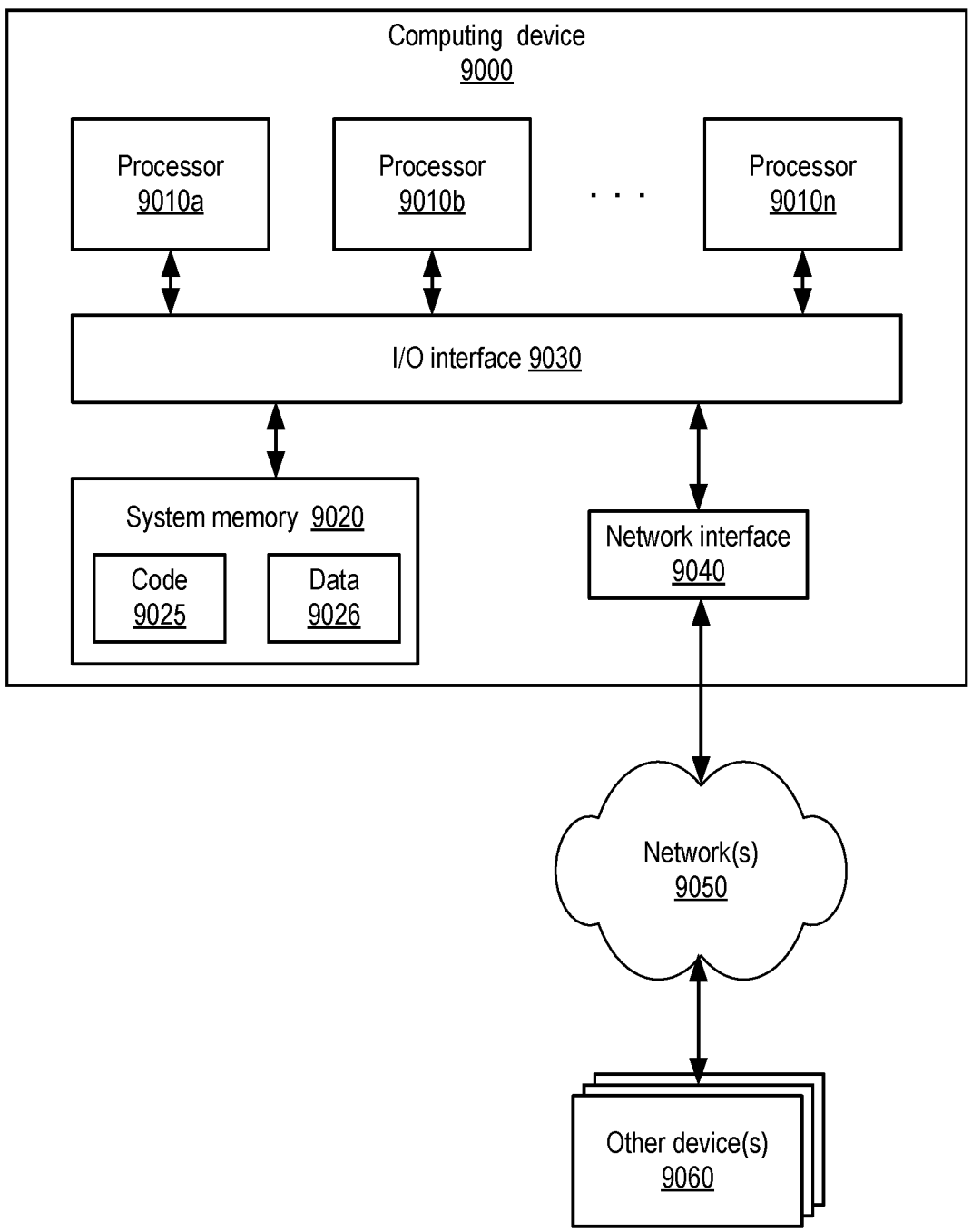
FIG. 10 is a block diagram illustrating an example computing device that may be used in at least some embodiments.

In at least some embodiments, a server that implements a portion or all of one or more of the technologies described herein, including the training and execution of machine learning models, extraction of influential token combinations, similarity analysis, substitute text generation, and the like, may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A system, comprising:
one or more computing devices of an artificial intelligence service;
wherein the one or more computing devices are configured to:
  train, using a plurality of text collections, a first machine learning model to classify an input text collection as an example of a particular class of a plurality of classes, wherein an individual text collection of the plurality of text collections comprises a plurality of tokens in a first language;
  identify, based at least in part on an analysis of a trained version of the first machine learning model, a respective set of influential token combinations corresponding to one or more classes of the plurality of classes, including a first set of influential token combinations corresponding to a first class of the plurality of classes, wherein an occurrence within a first text collection of a particular influential token combination of the first set is correlated with at least a threshold probability of classification of the first text collection as an example of the first class;
  obtain a classification candidate text collection comprising a plurality of tokens in a second language;

determine a similarity score between (a) at least a portion of the classification candidate text collection and (b) at least one influential token combination identified using the trained version of the first machine learning model;

generate, based at least in part on the similarity score, a substitute text collection corresponding to the classification candidate text collection, wherein the substitute text collection comprises at least one influential token combination for which a similarity score meets a first criterion;

identify, using the substitute text collection as input to one or more machine learning models, a predicted class of the classification candidate text collection, wherein the predicted class comprises one of the plurality of classes; and initiate one or more operations based at least in part on the predicted class.

2. The system as recited in claim 1, wherein the one or more computing devices are configured to:

determine that a classification request indicating the classification candidate text collection has been received via a programmatic interface.

3. The system as recited in claim 1, wherein the one or more computing devices are configured to:

in response to determining that a multi-language classification model training request has been received via a programmatic interface, train the first machine learning model and identify the respective sets of influential token combinations.

4. The system as recited in claim 1, wherein the one or more computing devices are configured to:

determine that a model language adaptation request has been received via a programmatic interface, wherein the model language adaptation request indicates the first machine learning model, wherein the respective sets of influential token combinations are identified in response to the model language adaptation request.

5. The system as recited in claim 1, wherein to determine the similarity score, the one or more computing devices are configured to:

analyze: (a) a first embedding vector representation of one or more tokens of the classification candidate text collection and (b) a second embedding vector representation of a particular influential token combination of the one or more influential token combinations.

6. A method, comprising:

performing, by one or more computing devices:

identifying, based at least in part on an analysis of a trained version of a first machine learning model, a respective set of influential token combinations corresponding to one or more classes of a plurality of classes, including a first set of influential token combinations corresponding to a first class of the plurality of classes, wherein an occurrence within a first text collection of a particular influential token combination of the first set is correlated with at least a threshold probability of classification of the first text collection as an example of the first class by the first machine learning model, wherein the first machine learning model is trained using a data set comprising text tokens of a first language;

determining a similarity metric between (a) at least a portion of a classification candidate text collection in a second language and (b) one or more influential token combinations identified using the trained version of the first classification model;

generating, based at least in part on the similarity metric, a substitute text collection corresponding to the classification candidate text collection, wherein the substitute text collection comprises at least a first influential token combination for which a similarity metric was determined; and identifying, using the substitute text collection as input to one or more machine learning models, a predicted class of the classification candidate text collection, wherein the predicted class comprises one of the plurality of classes.

7. The method as recited in claim 6, wherein the one or more machine learning models to which the substitute text collection is provided as input comprise a second machine learning model.

8. The method as recited in claim 7, wherein at least one model of the first and second machine learning models comprises one of: (a) a regression model or (b) a neural network model.

9. The method as recited in claim 6, wherein determining the similarity metric comprises analyzing: (a) a first embedding vector representation of one or more tokens of the classification candidate text collection and (b) a second embedding vector representation of a particular influential token combination of the one or more influential token combinations.

10. The method as recited in claim 6, wherein the similarity metric comprises a distance metric between a pair of data structures, wherein a first data structure of the pair comprises a semantic representation of one or more tokens of the classification candidate text collection, and wherein the second data structure of the pair comprises a semantic representation of one or more tokens of a particular influential token combination of the one or more influential token combinations.

11. The method as recited in claim 6, wherein determining the similarity metric comprises utilizing a machine translation algorithm.

12. The method as recited in claim 6, wherein said determining the similarity metric comprises examining a set of translations, in the second language, of the one or more influential token combinations identified using the trained version of the first classification model.

13. The method as recited in claim 6, wherein a particular influential token combination of the one or more influential token combinations comprises a plurality of consecutive tokens.

14. The method as recited in claim 6, wherein the particular influential token combination of the one or more influential token combinations comprises at least some non-consecutive tokens.

15. The method as recited in claim 6, further comprising performing, by the one or more computing devices:

determining that a model language adaptation request has been received via a programmatic interface, wherein the model language adaptation request indicates the first machine learning model, wherein said identifying the respective sets of influential token combinations is responsive to the model language adaptation request.

16. A non-transitory computer-accessible storage medium storing program instructions that when executed on one or more processors cause the one or more processors to:

identify a respective set of influential token combinations corresponding to one or more classes of a plurality of classes, including a first set of influential token combinations corresponding to a first class of the plurality of classes, wherein an occurrence within a first text collection of a particular influential token combination of the first set is correlated with at least a threshold probability of classification of the first text collection as an example of the first class by a first machine learning model, wherein the first machine learning model is trained using a data set comprising text tokens of a first language;

determine a similarity metric between (a) at least a portion of a classification candidate text collection in a second language and (b) one or more of the influential token combinations;

generate, based at least in part on the similarity metric, a substitute text collection corresponding to the classification candidate text collection; and identify, using the substitute text collection as input to one or more machine learning models, a predicted class of the classification candidate text collection, wherein the predicted class comprises one of the plurality of classes.

17. The non-transitory computer-accessible storage medium as recited in claim 16, wherein to determine the similarity metric, the instructions when executed on one or more processors cause the one or more processors to:

analyze (a) a first embedding vector representation of one or more tokens of the classification candidate text collection and (b) a second embedding vector representation of a particular influential token combination of the one or more influential token combinations.

18. The non-transitory computer-accessible storage medium as recited in claim 17, wherein to determine the similarity metric, the instructions when executed on one or more processors cause the one or more processors to:

learn, using at least a set of one or more token translations, one or more elements of a translation matrix associated with the first and second languages;

transform the second embedding vector based at least in part on the translation matrix; and compute the similarity metric based at least in part on a distance metric between the first embedding vector and the transformed version of the second embedding vector.

19. The non-transitory computer-accessible storage medium as recited in claim 16, wherein the instructions when executed on one or more processors cause the one or more processors to:

determine that a model language adaptation request has been received via a programmatic interface, wherein the model language adaptation request indicates the first machine learning model, wherein said identifying the respective sets of influential token combinations is responsive to the model language adaptation request.

20. The non-transitory computer-accessible storage medium as recited in claim 16, wherein to identify the respective set of influential token combinations, the instructions when executed on one or more processors cause the one or more processors to analyze the first machine learning model.

21. The non-transitory computer-accessible storage medium as recited in claim 16, wherein the substitute text collection comprises one or more positioning tokens in the first language, wherein the one or more positioning tokens results in placing a particular token of the first influential token collection at a targeted offset within the substitute text collection.

* * * * *